Nov. 22, 1960   D. S. PERRY ET AL   2,960,881
PARKING WINDSHIELD WIPER

Filed March 31, 1958   4 Sheets-Sheet 1

INVENTORS.
DONALD S. PERRY
ARTHUR N. KAISER
BY JAMES A. PURDY

Falvey, Souther & Stoltenberg
ATTORNEYS

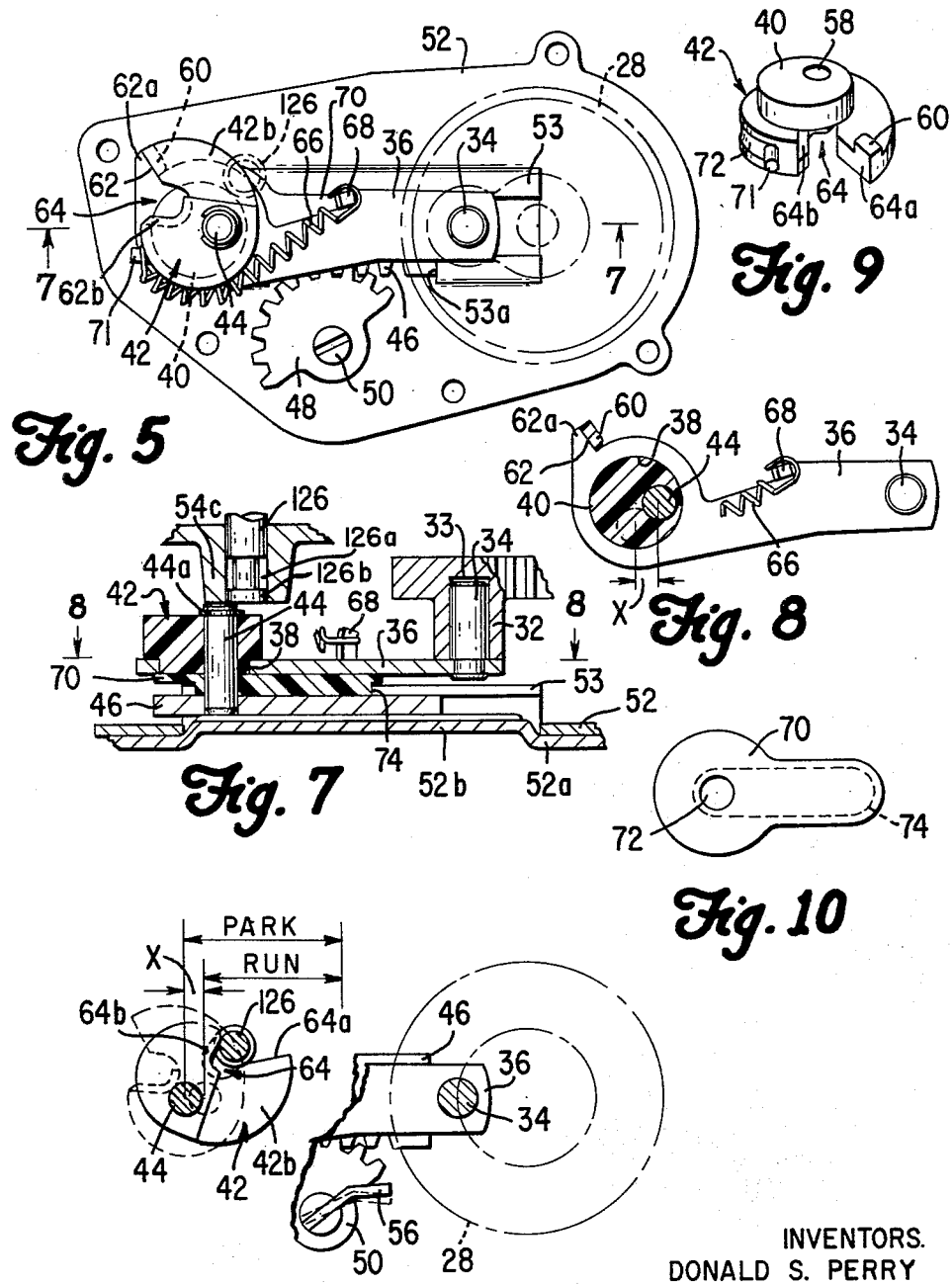

Nov. 22, 1960   D. S. PERRY ET AL   2,960,881
PARKING WINDSHIELD WIPER
Filed March 31, 1958   4 Sheets-Sheet 3
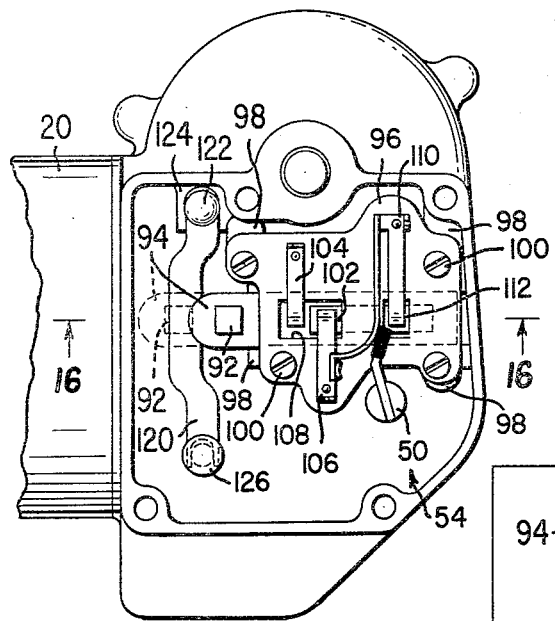
Fig. 11
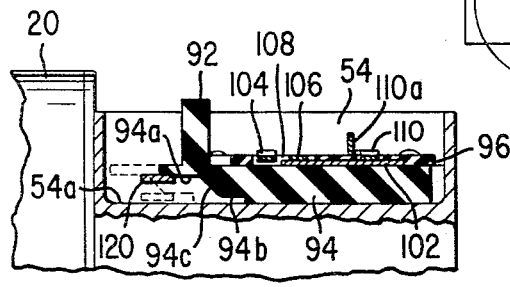
Fig. 16
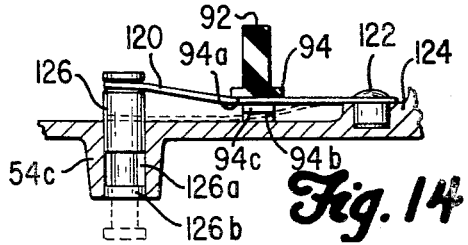
Fig. 14
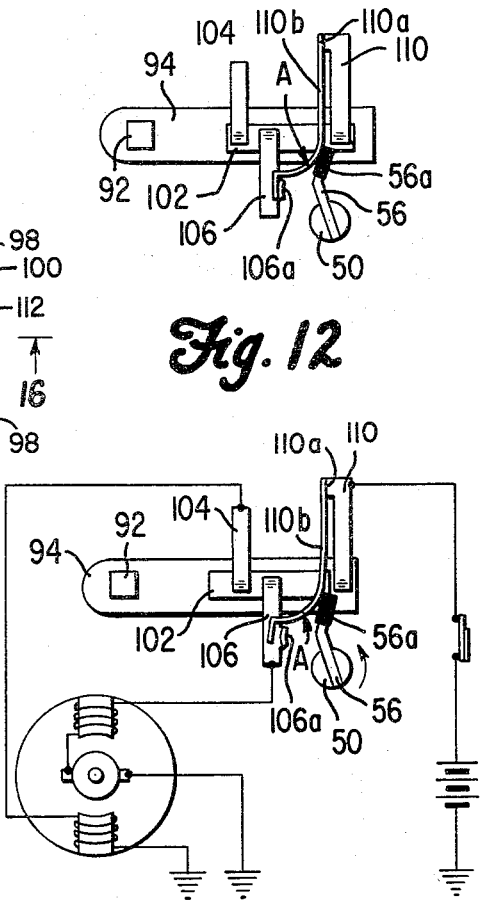
Fig. 12
Fig. 13
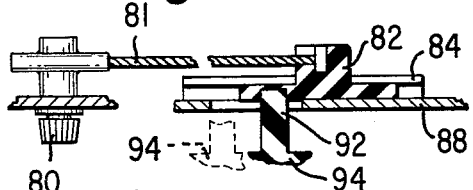
Fig. 15
INVENTORS.
DONALD S. PERRY
ARTHUR N. KAISER
BY JAMES A. PURDY
Falvey, Souther & Stoltenberg
ATTORNEYS Nov. 22, 1960     D. S. PERRY ET AL     2,960,881
PARKING WINDSHIELD WIPER Filed March 31, 1958     4 Sheets-Sheet 4

INVENTORS.
DONALD S. PERRY
ARTHUR N. KAISER
JAMES A. PURDY
BY
ATTORNEYS

United States Patent Office 2,960,881
Patented Nov. 22, 1960

2,960,881

PARKING WINDSHIELD WIPER

Donald S. Perry, Port Clinton, Arthur N. Kaiser, Toledo, and James A. Purdy, Rossford, Ohio, assignors to The Electric Auto-Lite Company, Toledo, Ohio, a corporation of Ohio Filed Mar. 31, 1958, Ser. No. 725,176

12 Claims. (Cl. 74—70)

This invention relates to actuating devices for oscillating windshield wipers, more particularly to an electric windshield wiper mechanism, which is adapted to move the wiper blades to parked position beyond their normal sweep of oscillation.

With the advent of larger windshields on automotive vehicles, particularly the windshields which are of curved conformation, much greater power is required to operate the windshield wipers, so that the vacuum type of windshield wiper is no longer adequate or economically feasible. The vacuum type windshield wiper has the advantage of automatically parking the wiper blade along the lower edge of the windshield beyond its normal sweep of oscillation by causing the parking to occur with the vacuum active on only one side of the vane of the activating motor. It is highly desirable to incorporate this parking feature in an electric wiper, which has practically no power limitation. Furthermore, it is desirable to incorporate this parking feature in an electric wiper which is cheap to manufacture and, at the same time, is reliable and trouble-free during the use of the automotive vehicle.

It is, therefore, a principal object of this invention to provide an off-glass parking windshield wiper which is operated by an electric motor running in only one direction, wherein the parking cycle is initiated manually and occurs only during the normal sweep of the wiper blade across the windshield, so as to leave the cleaned portion of the windshield after parking without the blemish that is commonly incurred by the blade in reversing its direction before completion of the normal outboard stroke.

It is a further object of this invention to provide an electric windshield wiper having off-glass parking wherein the parking cycle is initiated and completed during the last complete wiping oscillation of the wiper blade across the windshield.

It is a further object of this invention to provide an electric windshield wiper having off-glass parking which is attained through a manually-controlled mechanism to effect a lengthening of a driving link to move the wiper to its off-glass parked position.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

Fig. 5 is a plan view of the back side of the cover mechanism shown in Fig. 2 with portions of the operating mechanism in position thereon;

Fig. 6 is a schematic representation of the changes in the operating mechanism shown in Fig. 5;

Fig. 7 is an elevational view, partly in section, taken generally along line 7—7 of Fig. 5;

Fig. 8 is a plan view of a portion of the mechanism showing the driven member taken along the line 8—8 of Fig. 7;

Fig. 9 is an isometric view of one element of the operating mechanism;

Fig. 10 is a plan view of a spacer element of the operating mechanism;

Fig. 11 is a plan view of the switch compartment of the mechanism;

Fig. 12 is a schematic view of the switch in one position;

Fig. 13 is a schematic diagram of connections;

Fig. 14 is an elevational view showing the cooperation between the switch element and the retractable parking pin;

Fig. 15 is a schematic view showing the manual mechanism for operating the switch;

Fig. 16 is an elevational view of the switch taken along the line 16—16 of Fig. 11.

Figure 1:
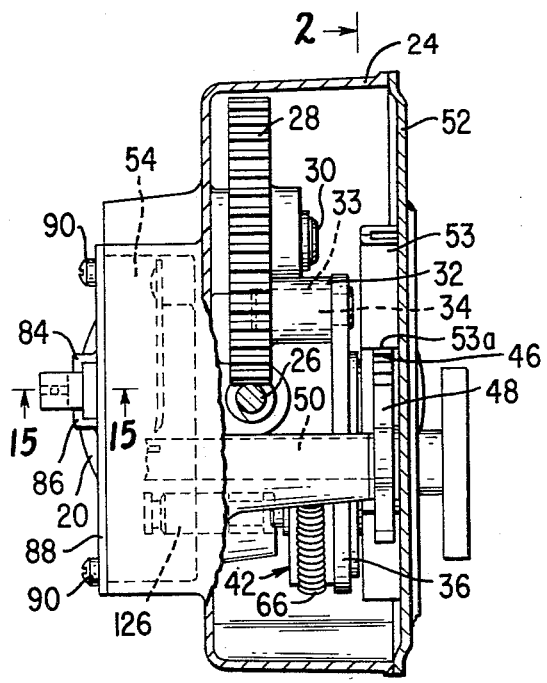
Fig. 1 is a plan view, partly in section, showing the main compartment of the mechanism in which the driving and driven means are positioned.
Figure 3:
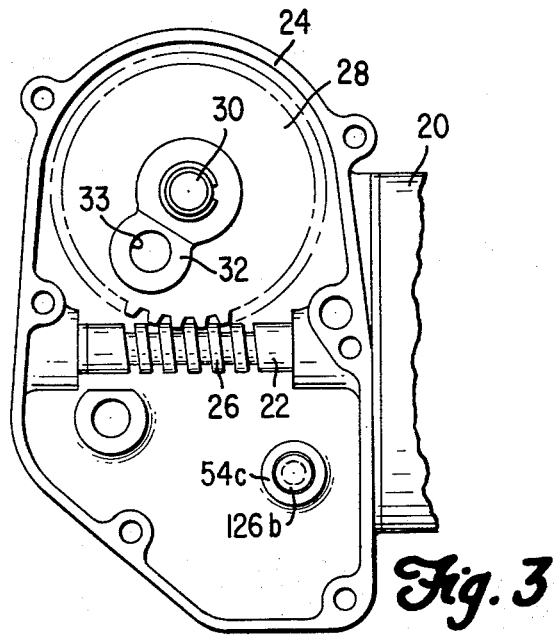
Fig. 3 is a plan view of the main housing with the cover and some of the operating mechanism removed.

Referring to the drawings, particularly to Figs. 1 and 3, an electric motor 20 is shown which may be selected to have sufficient power to drive the windshield wipers (not shown) of an automotive vehicle. The motor armature drives a shaft 22 journaled in suitable bearings in a casing member 24, into which the shaft extends. The shaft portion within the casing is provided with a worm 26, which drives a worm gear 28 journaled on a stub shaft 30 affixed to the casing in any suitable manner. The worm gear 28 is provided with an eccentric boss 32 having a bore 33 into which is rotatably fitted a pintle 34 affixed to a link 36, which is driven and oscillated by the gear 28 as it is being rotated by the worm 26. The link is shown in Fig. 8. The opposite end of the link 36 is provided with a relatively large opening 38 in which is seated an eccentric or cam 40 forming an integral part of an actuator member 42 (Fig. 9) which, when rotated at selected times, as will appear hereinafter, varies the eccentricity of a driving pin 44 with reference to the opening 38, thereby changing the effective length of the link 36.

Figure 4:
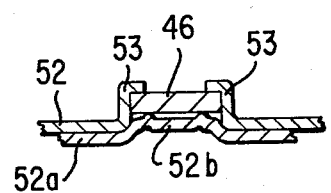
Fig. 4 is an elevational view of a portion of the cover taken along the line 4—4 of Fig. 2.
Figure 17:
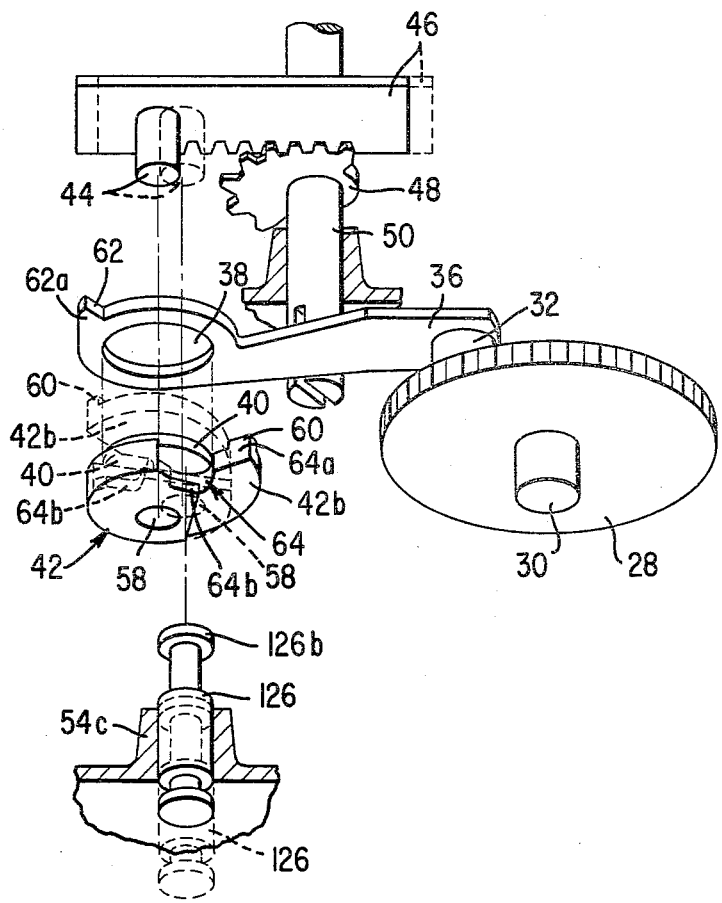
Fig. 17 is a schematic view of the operating mechanism of the windshield wiper.

The pin 44 is affixed in a driven member 46 in the form of a gear rack (Fig. 2) which drives a gear sector 48 affixed to a shaft 50 which extends externally of a cover 52 for the casing 24 being attached thereto by screws or the like. The gear rack 46 or driven members is slideable in a pair of guides 53 struck up from the back or inside of the cover 52, being cut away at 53a to allow cooperation of its tooth portion with the gear sector 48. A plate 52a is provided on the outside of the cover 52 affixed thereto by welding or the like to form a floor 52b for the guide section (Fig. 4). The shaft 50 also extends through the opposite wall of the casing 24, into a switch chamber 54 (Fig. 1) where it is provided with a transverse arm 56 (Figs. 6, 12 and 13) to actuate a switch element, to break the motor circuit at selected times as will also appear hereinafter.

The actuator member 42, shown in Fig. 9, is preferably a molded part adapted to be rotated at selected times about the pin 44, which is journaled in a bore 58 positioned eccentrically with reference to the cylindrical cam member 40 and, therefore, with the opening 38 in the end of the link 36. A stop 60 is provided on the actuator member 42 in the plane of the cam portion 40 to contact the forward face 62 of a projection 62a on the link 36 as is best seen in Figs. 8, 9 and 5. The parts are arranged so that an opening or bight 64 faces to the left (Fig. 5) when the stop 60 is in contact with the face 62 being biased thereagainst by a helical spring 66 anchored on one end on an integral ear 68 on the link 36 and attached at its other end to an integral pin 71 on the actuator member 42 on the opposite side of the bight 64, so that the spring is seated in a groove 72 on the perimeter of the actuator member 42 as is best seen in Fig. 5. By referring to this figure, it will be noted that the pin 44 is positioned on the right side of the cam 40 which establishes a relation between the pintle 34 and the pin 44 in which these parts are in their closest relation, in other words, the effective length of the link 36 is as short as it can be, giving consideration to the position of the cam 40. This is the normal operating relation of the driving and driven parts, whereby the wipers are oscillated through their normal operating angle over the windshield.

Figure 2:
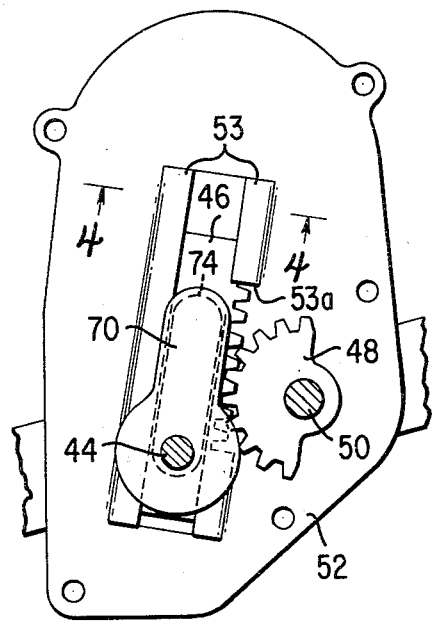
Fig. 2 is an elevational view of the back side of the cover taken along the line 2—2 of Fig. 1.

Referring to Fig. 10, a spacer 70 is shown which is provided with a bore 72 into which is fitted pin 44, so that it reciprocates with the rack 46 and holds the link 36 in spaced relation therewith. (See Fig. 7.) The lower side of the spacer 70 is provided with an elongated boss 74 having rounded ends which are adapted to reciprocate between the slides 53 which hold it in position to prevent rotation during its reciprocation (Fig. 2). The spacer 70 and the actuator member 42 are held in position on the pin 44 by a spring washer 44a mounted in a suitable slot on the end of the pin as shown in Fig. 7.

The rotation of the worm gear 28 by the worm 26 driven by the electric motor 20 oscillates the link 36, which, in turn, reciprocates the pin 44 and its rack 46 along a predetermined path by cooperating with the guides 53. The rack 46 oscillates the sector gear 48 and its shaft 50 through the desired angle, which is connected by any convenient means (not shown) to the pivot shafts on which the wiper blades are mounted. In order to move the wiper blades to an "off glass" parked position, the blades must be moved an additional angle of approximately 17° on the inboard end of their oscillation or sweep over the windshield, so that the blades will be parked substantially parallel to and against the bottom edge of the windshield. The mechanism whereby this parked position is attained at selected times will now be described.

The parked position of the wiper blades is attained by rotating the actuator member 42 clockwise about the pin 44 to change the position of the cam portion 40 about the pin, so that the relation between the aperture 38 in the end of the link 36 and the pin 44 is varied to change the effective length of the link 36 which increases the length of the link 36 to move the rack 46 a greater distance outwardly by moving its driving pin 44 in a new relation with reference to the aperture 38 (see Figs. 6 and 8). Here the pin 44 is moved leftwardly or outwardly a distance X by the clockwise rotation of the cam 40. This changes the position of the shaft 50 by approximately 17° to attain the parked off-glass position of the wiper blades.

With the pin 44 reciprocating in its normal path, including the actuator member 44 in its normal operating position substantially as shown in Fig. 5, the rack 46 oscillates the sector gear 48 and its shaft 50 through its normal angle of sweep. In this position, the bight 64 (Figs. 5 and 9) of the actuator member faces toward the left (Fig. 5), being biased to this position by the helical spring 66, so that the stop 60 rests against the face 62 on the projection 62A. In order to change these relations, an interference is provided which the operator of the motor vehicle initiates by actuating a manual control knob 80 (Fig. 15) on the dashboard of the automotive vehicle which, in turn, actuates by a Bowden wire connection 81, a slider 82 mounted in sliding relation in a pair of guides 84 and 86 mounted on the outside of the closure plate 88 of the switch housing 54 already described. The closure plate 88 is held in position on the housing 54 by screws 90 (Fig. 1).

The movement of the slider 82 is transmitted by a mechanical interlock to move a projection 92 of an insulating switch plate 94, also slidably mounted between the floor 54a of the casing 54, and an insulating contact plate 96 affixed on suitable bosses 98 by screws 100 to hold the contact plate 96 a fixed distance from the floor 54a. The side faces of the bosses 98 assist in guiding the switch plate 94 in its sliding reciprocating relation when moved by the manual actuation of the control knob 80. The upper side of the switch plate is provided with an imbedded conducting bar 102 which cooperates with contact springs 104 and 106 affixed to the insulating contact plate through an aperture 108 therein. The bar 102 also cooperates at selected times with a third fixed resilient contact spring 110 through a second aperture 112 in the contact plate 96 (Fig. 11).

The resilient contact member 110 adjacent its point of fixation to the insulating contact plate 96 is provided with an upstanding ear 110a, to which is attached a fourth resilient contact spring 110b which moves transversely of the first portion of the spring 110, so that it makes or breaks electrical contact with an upstanding ear 106a struck up from the resilient contact spring 106 near its point of fixation to the plate 96. The fourth contact spring 110b is given an adjustable arcuate conformation A adjacent its center where it is adapted to cooperate with arm 56 affixed to the end of the shaft 50 projecting into the switch housing 54 as already described. An insulating boot 56a is provided for the arm 56 to prevent a short circuit when cooperative contact is made with the fourth leaf spring 110b which will be further described hereinafter.

Returning now to the switch plate 94, which is actuated by its projection 92, it moves to the left as shown in phantom in Fig. 11 to cooperate with a leaf spring 120 which is mounted transversely thereof by being affixed by a rivet 122 on a boss 124 integral with the floor 54a of the housing 54. The forward end of the sliding plate 94 is undercut to provide a pair of spaced lands 94a and 94b connected by an oblique portion 94c. In retracted position, the land 94a of the plate 94 contacts the upper side of a mid portion of the leaf spring 120 (Fig. 16) but when the plate 94 is moved to the left, as shown in phantom in Figs. 11 and 16, the mid portion of the leaf spring contacts the lower land 94b of the plate 94, having negotiated the oblique portion 94c to attain this position. Due to the length of the leaf spring 120 this allows either an outwardly acting bias or an inwardly acting bias to be applied to the free end of the spring where it is bifurcated to cooperate with the headed end of a slideable stud 126 fitted into a bore 126a in the floor 54a of the switch housing 54, the bore 126a also piercing a boss 54c extending into the main housing 24 where the opposite end of the stud is undercut to provide another head 126b (Figs. 7 and 14) which cooperates with the actuator member 42 at selected times to provide an interference to cause relative rotation of the actuator member 42.

Referring to Figs. 6 and 7, it will be noted that the headed stud 126, slideable in the bore 126a and controlled by the interaction of spring 120 with slide 94, when thrust downwardly (Fig. 7), will interfere and contact with the actuator member 42 by entering the bight 64 therein, in which aid is provided by a cam face 64a. As pointed out before, the spring 120 may be biased either inwardly or outwardly, or, in other words, towards or away from the actuator member 42, so that, when the conditions are suitable, movement of the stud 126 will occur. For inward or engaging motion of the stud 126, the spring 120 is engaged by the land 94b of the slide 94 to provide the spring bias acting toward the actuator member 42. If the actuator member is in its most advanced phase, as shown in Fig. 5, no movement of the stud 126 will occur, because the bias of the spring urges it against the adjacent face 42b of the actuator member 42, above the locus of movement of the projecting end of the stud 44, so that no interference will occur at this point. As the link 36 is retracted by the worm gear 28 in its normal oscillation, the actuator member 42 will follow until the face 42b thereof is freed from the stud 126, which will then move inwardly to relieve the bias of the spring 120 to the position shown in phantom in Fig. 14. On the return stroke of the link 36, the cam face 64a of the actuator member 42 will strike the stationary projecting stud 126, so that the actuator member will rotate against the bias of spring 66 around the stud which is then positioned deeply within the bight 64, as shown in Fig. 6. The stud head 126b interlocks with a ledge 64b on a side wall of the bight 64 in the actuator member 42, to prevent retraction of the stud 126 from the bight until the stud is again freed from the bight by the return stroke of the link 36.

The rotation of the actuator member 42 created by the interference between the bight 64 of the actuator member and the relatively fixed stud 126, rotates the integral cam portion 40 of the actuator member to increase the effective length of the link 36 by a distance X, as already described and clearly shown in Figs. 6 and 8. The increase in the effective length of the link 36, moves the rack 46 further outwardly, to thereby rotate the gear sector 48 and its shaft an additional angle to create the desired parking position of the windshield wiper blades which are driven by the shaft. The extra rotation of the shaft 50 also causes the same angular over travel of the small arm 56 in the switch compartment, so that it moves beyond its normal arc of movement to contact switch element 110b at its curved portion A, already described, to separate its end from the ear 106a which will open the power circuit to the motor as will be seen from an examination of the motor power circuit shown in Fig. 13.

Assuming now that the operator of the motor vehicle wishes to start the windshield wipers from their quiescent parked position with the essential parts of the parking mechanism in the position shown in Fig. 6, he will then actuate the manual control knob 80 on the dashboard to retract the slide member 82 to the right (Fig. 15) which will carry with it the projection 92 of the second slide 94. This will reengage the contact 102 on the slide 94 with the fixed contacts 104, 106 and 110 to reestablish the electric power circuits to the motor 20, which will then begin to rotate and, through its drive elements, initiate the return stroke of the link 36. At the same time, the movement of the slide 94 will disengage the land 94b from the spring 120, which will move across the oblique portion 94c to engage the upper land 94a (Fig. 16) which will place an upwardly and outwardly acting bias (Fig. 14) on the sliding stud 126 by the action of the spring 120. This spring bias will not move the stud 126 from its engagement with the bight 64 of the actuator member 42, because the head 126b is interlocked with the ledge 64b as already described. However, as the return stroke of the link 36 gets under way, the reverse rotation of the actuator member about the pin 126 and the bias of the spring 66 rotate the actuator member 42 in a counterclockwise direction (Fig. 6) around the stud 126 until the stud clears the bight 64. At this time, the interlock between the head 126b of the stud is broken and the bias of the spring 120 retracts the stud to its normal operating position where it does not interfere with the normal oscillation of the parts during the normal operating phase of the mechanism. The forces arising from the rotation about the pin 12 and the bias of the spring 66 rotate the actuator member 42 until the stop 60 again contacts the face 62 on the link. This action reduces the effective length of the link to its normal dimension and its normal operating relations. By this action, the sweep of the windshield wipers is returned to its normal relation with reference to the windshield. At the same time, the sweep of the small arm 56 (Figs. 6, 12 and 13) returns to normal and the contact arm 110b again engages the ear 106a.

These operating conditions will obtain until the operator again initiates the parking phase by actuating the knob 80 to its original parking position first described.

The rotation of the cam 40 can also be utilized to change the position of the rack 46 itself with reference to the sector gear 48 to attain the same purpose which is to rotate the sector gear through an additional angle to create the off-glass parking conditions. This may be done without creating a change in the effective length of the link 36 by having the throw of the cam 40 cooperate with the rack rather than with the link.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a link-lengthening device, a driving member, a driven member, a link connecting the driving and the driven member, said link being connected to the driven member by a pivotal connection adapted to move in a predetermined path, a rotatable cam positioned between the link and the pivotal connection spring-biased to a predetermined normal operating position which when rotated changes the driving relation between the link and the driven member by varying the effective length of the link, manually-actuated means movable transversely of the plane of the predetermined path of movement of the pivotal connection for the link to create conditions of interference to rotate the cam, and actuating means fixed to the cam to cause rotation thereof from its normal spring-biased position to a new position when interference occurs between it and the manually-actuated means, whereby the effective length of the link is changed at the new position of the cam.

2. In a link-lengthening device, a driving member, a driven member, a link connecting the driving and driven members including a pivotal connection to both the driving and driven members, the pivotal connection between the link and the driven member being provided with a rotatable cam which during the driving relation is adapted to move in a predetermined path, spring means cooperating with the cam to bias the cam about its pivotal connection to a predetermined normal position, said cam being adapted to rotate about its pivotal connection when rotated under predetermined conditions of manually-controllable interference against the bias of said spring to vary the effective length of the link, manually-actuated means movable transversely of the plane of the predetermined path of movement of the cam to create the controllable conditions of interference to rotate the cam, and actuating means fixed to the cam to cause rotation thereof from its normal position against the bias of the spring to a new position when interference accurs between it and the manually-actuated means which has just been moved into the locus of the predetermined path of movement of the cam, whereby the effective length of the link is changed at the new position of the cam.

3. In a link-lengthening device, a driving member, a driven member, a link connecting the driving and driven members by a pair of pivotal connections therebetween, the pivotal connection between the link and the driven member including a rotatable cam being adapted to move in a predetermined path, the cam when rotated about the pivotal connection changes the effective length of the link, a spring to bias the cam to a predetermined normal operating position, means comprising a pintle movable transversely of the plane of movement of the cam so that when it is moved into the locus of the predetermined path of movement of the cam interference conditions are created which are adapted to rotate the cam, and actuating means fixed to the cam which when moved into contact with said pintle causes a rotation of the cam from its normal operating position to a new position which changes the effective length of the link.

4. In a link-lengthening device suitable for use with off-glass windshield wiper parking devices, a rotatable driving member, a reciprocating driven member, a link pivotally connected to both the driving and driven members, the pivotal connection between said link and the driven member being provided with a rotatable cam which when rotated changes the effective length of the link, a resilient means to bias the cam against a stop for the normal operating position, a manually-actuated pintle movable in a plane transversely of the plane of movement of the link adapted to be moved into the locus of the predetermined path of movement of the link to create conditions of interference whereby the cam is rotated, and actuating means fixed to the cam comprising a bight opening in the direction of said pintle and adapted to move about the pintle as the link approaches the end of its stroke whereby rotative effort is applied to the cam to change the effective length of the link at the new position of the cam.

5. In a link-lengthening device, a driving member, a driven member, a link connecting the driving and the driven member, said link being connected to the driven member by a pivotal connection including a cam member adapted to move in a predetermined path, said cam member being rotatably-positioned between the link and the driven member and spring-biased to a predetermined normal operating position, the cam member when rotated being adapted to change the driving relation between the link and the driven member by varying the effective length of the link, manually-actuated means movable transversely of the plane of the predetermined path of movement of the movable cam member on the link to create conditions of interference with a portion of the cam member to rotate the cam member, and actuating means fixed to the cam member to cause rotation thereof from its normal spring-biased position to a new position when interference occurs between it and the manually-actuated means, whereby the effective length of the link is changed at the new position of the cam member.

6. In a link-lengthening device, a driving member, a driven member, a link connecting the driving and the driven member said link being connected to the driven member by a pivotal connection including a rotatable cam adapted to move in a predetermined path, said rotatable cam being provided with a lateral projection and being spring-biased to a predetermined normal operating position, manually-actuated means movable transversely of the plane of the predetermined path of movement of the pivotal connection for the link to create conditions of interference at selected times between itself and a part of the cam to rotate the cam, and actuating means in the lateral projection of the cam to cause rotation thereof from its normal operating spring-biased position to a new position when interference occurs between it and the manually-actuated means, whereby the effective length of the link is changed at the new position of the cam.

7. In a link-lengthening device, a driving member, a driven member, a link connecting the driving and driven members including a pivotal connection to both the driving and driven members, the pivotal connection between the link and the driven member being provided with a rotatable cam which during the driving relation is adapted to move in a predetermined path, spring means cooperating with the cam to bias the cam about its pivotal connection to a predetermined normal operating position, said cam having a portion including a U-shaped bight adapted to rotate the cam about its pivotal connection against the bias of said spring when predetermined interference conditions are manually varied to change the effective length of the link, manually-actuated means including a pintle movable transversely of the plane of the predetermined path of movement of the cam to create conditions of interference by engagement of the pintle in the bight to rotate the cam to thereby vary the effective length of the link.

8. In a link-lengthening device suitable for use with off-glass windshield wiper parking devices, a rotatable driving member, a reciprocating driven member, a link pivotally connected to both the driving and driven members, the connection between said link and the driven member being provided with a rotatable cam which when rotated changes the effective length of the link, a resilient means to bias the cam against a stop for normal operating position, a manually-actuated pintle movable in a plane transversely of the plane of movement of the link adapted to be moved into the locus of the predetermined path of movement of the link during reciprocation to create conditions of interference whereby the cam is rotated, actuating means fixed to the cam comprising a U-shaped bight opening in the direction of said pintle and adapted to rotate about the pintle as the link approaches the end of its stroke whereby rotative effort is applied to the cam to change the effective length of the link at the new position of the cam, and an interlocking means active between the pintle and the actuating means to prevent disengagement thereof until the cam has reached a predetermined position in its cycle of movement.

9. In a link-lengthening device suitable for use with off-glass windshield wiper parking devices, a rotatable driving member, a reciprocating driven member, a link pivotally connected to both the driving and driven members, the connection between said link and the driven member being provided with a rotatable cam which when rotated changes the effective length of the link, a resilient means to bias the cam against a stop for normal operating position, a pintle movable in a plane transversely of the plane of movement of the link, resilient means to move the pintle whose bias is manually-controllable to advance or retract the pintle into or from the locus of the predetermined path of movement of the link during reciprocation to create conditions of interference whereby the cam is rotated, actuating means fixed to the cam comprising a U-shaped bight opening in the direction of said pintle and adapted to rotate about the pintle as the link approaches the end of its stroke whereby rotative effort is applied to the cam to change the effective length of the link at the new position of the cam, and an interlocking means on the pintle and the bight to prevent retraction of the pintle by the action of the bias of the resilient means until the cam has reached a predetermined point in its cycle of reciprocation.

10. In a device of the class described, a driving member, a driven member, a link connecting the driving and the driven member said link being connected to the driven member by a pivotal connection, a rotatable cam positioned at the pivotal connection spring-biased to a predetermined normal operating position which when rotated changes the driving relation between the link and the driven member, manually-actuated means movable transversely of the path of movement of the pivotal connection to create conditions of interference to rotate the cam, and actuating means fixed to the cam to cause rotation thereof from its normal spring-biased position to a new position when interference occurs between it and the manually-actuated means to change the relation of the link with reference to the driven member.

11. In a device of the class described, a driving member, a driven member, a link connecting the driving and the driven member, said link being connected to the driven member by a pivotal connection including a rotatable cam adapted to move in a predetermined path, said rotatable cam being provided with a lateral projection and being spring-biased to a predetermined normal operating position, manually-actuated means movable transversely of the plane of the predetermined path of movement of the pivotal connection for the link to create conditions of interference at selected times between itself and the part of the cam causing rotation thereof from its normal operating spring-biased position to a new position when said interference occurs whereby the driving relation between the link and the driven member is effected.

12. In a device of the class described, a driving member, a driven member, a link connecting the driving and the driven members including a pivotal connection to both the driving and driven members, the pivotal connection between the link and the driven member being provided with a rotatable cam which during the driving relation is adapted to move in a predetermined path, spring-means cooperating with the cam to bias the cam about its pivotal connection to a predetermined normal position, said cam being adapted to rotate about the pivotal connection under predetermined conditions of manually-controlled interference against the bias of said spring to vary the driving relation of the link and the driven member, manually-actuated means movable transversely of the plane of the predetermined path of movement of the cam to create the controllable conditions of interference to rotate the cam, and actuating means fixed to the cam to cause rotation thereof from its normal operating position against the bias of the spring to a new position when said interference occurs between it and the manually-actuated means which has just been moved into the locus of the predetermined path of movement of the cam, whereby a change in the driving relations of the link and the driven member is effected.

References Cited in the file of this patent

UNITED STATES PATENTS

| 2,749,498 | Lautzenhiser | June 5, 1956 |
| 2,861,457 | Harrison | Nov. 25, 1958 |

FOREIGN PATENTS

| 499,082 | Great Britain | Jan. 18, 1939 |
| 873,802 | Germany | Apr. 16, 1953 |